(12) United States Patent
Mezger et al.

(10) Patent No.: US 8,227,559 B2
(45) Date of Patent: Jul. 24, 2012

(54) VINYL ESTER MALEIC ACID DERIVATIVE COPOLYMERS

(75) Inventors: Jochen Mezger, Garching an der Alz (DE); Alexander Kraus, Evenhausen (DE); Harald Grassl, Feichten an der Alz (DE); Kerstin Becher, Schnaitsee Waldhausen (DE)

(73) Assignee: Construction Research & Technology GmbH, Trostberg (DE)

( * ) Notice: Subject to any disclaimer, the term of this patent is extended or adjusted under 35 U.S.C. 154(b) by 185 days.

(21) Appl. No.: 12/864,543

(22) PCT Filed: Jan. 12, 2009

(86) PCT No.: PCT/EP2009/050259
§ 371 (c)(1),
(2), (4) Date: Sep. 29, 2010

(87) PCT Pub. No.: WO2009/098103
PCT Pub. Date: Aug. 13, 2009

(65) Prior Publication Data
US 2011/0054082 A1    Mar. 3, 2011

(51) Int. Cl.
*C08F 22/16*    (2006.01)
(52) U.S. Cl. ............... 526/318; 525/327.7; 525/327.8; 525/329.5; 525/418; 525/451; 526/78; 526/86; 526/218.1; 526/219.2; 526/232.1; 526/318.4; 526/328; 526/328.5; 526/329.5; 526/330; 528/271; 528/425

(58) Field of Classification Search ............... 525/327.7, 525/327.8, 329.5, 418, 451; 526/78, 86, 526/218.1, 219.2, 232.1, 318, 318.4, 328, 526/328.5, 329.5, 330; 528/271, 425
See application file for complete search history.

(56) References Cited

U.S. PATENT DOCUMENTS

| | | | |
|---|---|---|---|
| 2,668,810 A | | 2/1954 | Bergmeister et al. |
| 5,385,971 A | * | 1/1995 | Sauer et al. ............ 524/558 |
| 5,731,368 A | * | 3/1998 | Stanley et al. .......... 523/340 |
| 6,653,428 B1 | * | 11/2003 | Klein et al. ............ 526/321 |
| 2010/0233100 A1 | * | 9/2010 | Castle et al. ............ 424/48 |

OTHER PUBLICATIONS

Hu Xiance; Liu, Wanyu; Jiang, Weiguo, and Zong, Hijuan. "Preparation of single-ion polymer conductor—comblike polymers with carboxylate groups". Yingyong Huaxue 1993, 10(6), 14-18.*
PCT/EP2009/050259-Written Opinion of the International Searching Authority, Mar. 20, 2009.
PCT/EP2009/050259-International Search Report, Mar. 20, 2009.

* cited by examiner

*Primary Examiner* — Vasu Jagannathan
*Assistant Examiner* — Richard A Huhn
(74) *Attorney, Agent, or Firm* — Curatolo Sidoti Co., LPA; Joseph G. Curatolo; Salvatore A. Sidoti

(57) ABSTRACT

The invention relates to a process for the preparation of a copolymer by free radical mass polymerization of a maleic acid monoester derivative with vinyl ester in the presence of an acid having a pKa of less than 1.8. The copolymer is suitable as a dispersant for hydraulic binders.

20 Claims, No Drawings

VINYL ESTER MALEIC ACID DERIVATIVE COPOLYMERS

CROSS REFERENCE TO RELATED APPLICATIONS

This application is a national stage application of International Application No. PCT/EP20091050259, filed 12 Jan. 2009, which claims priority from European Patent Application Serial No. 08 101 373.2, filed 7 Feb. 2008, from which applications priority is claimed, and which are incorporated herein by reference.

The present invention relates to a process for the preparation of a copolymer, the copolymer and the use of the copolymer.

It is known that admixtures in the form of dispersants are often added to aqueous slurries of pulverulent inorganic or organic substances, such as clays, silicate powder, chalk, carbon black, crushed rock and hydraulic binders, in order to improve their processability, i.e. kneadability, spreadability, sprayability, pumpability or flowability. Such admixtures are capable of breaking up solid agglomerates, of dispersing the particles formed and in this way of improving the processability. This effect is utilized in particular in a targeted manner in the preparation of building material mixtures which contain hydraulic binders, such as cement, lime, gypsum or anhydrite.

In order to convert these building material mixtures based on said binders into a ready-to-use, processable form, as a rule substantially more mixing water is required than would be necessary for the subsequent hydration or hardening process. The proportion of cavities which is formed by the excess water subsequently evaporating in the concrete body leads to significantly poorer mechanical strengths and resistances.

In order to reduce this excess proportion of water at a predetermined processing consistency and/or to improve the processability at a predetermined water/binder ratio, admixtures, which are generally referred to as water-reducing agents or super-plasticizers, are used. Copolymers which have maleic acid monoester structural units and polyethoxy side chain segments and are prepared by free radical solution polymerization have proved useful in practice as such agents. Water is used as a solvent. The aqueous copolymer solution prepared could be used directly as a dispersant or superplasticizer, virtually without further working-up. However, such aqueous products do not have a sufficient shelf-life. In order to ensure sufficient shelf-life, the water must be removed from superplasticizers based on aqueous maleic acid monoester solutions by high-energy drying, e.g. by spray drying. This reduces the economic attractiveness of such superplasticizers considerably.

An esterification of the anhydride side groups of maleic anhydride/vinyl acetate copolymers with polyethylene glycols, described in the Chinese Journal "Yingyong Huaxue (1993), 10 (6), 14-18" (in English: "Chinese Journal of Applied Chemistry (1993), 10 (6), 14-18"), could be regarded as an alternative preparation to the aqueous solution polymerization explained above with subsequent drying. A disadvantage of this grafting process is that esterification catalysts, such as, for example, 4-dimethylaminopyridine, or Lewis acids, such as zinc chloride, are used which to a certain extent also cause deacetylation of the vinyl acetate building block. In practice, this leads to a poorly calculable change in the polymer properties. In addition, relatively long reaction times have to be accepted. Finally, it may also be said that it is usually not possible to achieve by grafting processes side chain densities (regarding long side chains) in the copolymer which are as high compared with those obtained by copolymerization of monomers which have corresponding side chains. It may thus be said that this grafting process is not an attractive alternative preparation.

It was therefore the object of the present invention to provide a process for the preparation of a qualitatively good and especially economical dispersant for hydraulic binders, it being intended for the dispersant to be based on polymers having maleic acid monoester structural units.

This object is achieved by a process for the preparation of a copolymer by reacting a maleic acid monoester derivative with a vinyl ester in the presence of a free radical polymerization initiator and of an acid having a pKa of less than 1.8 so that
i) 10 to 75 mol % of a maleic acid monoester derivative structural unit α,
ii) 25 to 90 mol % of a vinyl ester structural unit β,
are produced in the copolymer, the maleic acid monoester derivative structural unit a being represented by the following general formula (I)

where
X is identical or different (i.e. variable within a copolymer) and is represented by $-O-(C_mH_{2m}O)_n-R^1$ where $R^1$ is identical or different and is represented by a branched or straight-chain $C_1$ to $C_{20}$ alkyl radical (preferably $CH_3$), $C_5$ to $C_8$ cycloalkyl radical (preferably cyclohexyl) and/or $C_6$ to $C_{14}$ alkylaryl radical (preferably toluoyl)—(overall, however, $R^1$ is particularly preferably $CH_3$),
m is identical or different (i.e. variable within a copolymer) and is represented by 2, 3 and/or 4,
n is identical or different (i.e. variable within a copolymer) and is represented by an integer from 1 to 150,
and the vinyl ester structural unit β being represented by the following general formula (II)

where
$R^2$ is identical or different (i.e. variable within a copolymer) and is represented by a branched or straight-chain $C_1$ to $C_{12}$ alkyl radical (preferably $CH_3$), and
the reaction of the maleic acid monoester derivative with the vinyl ester is effected in a reaction mixture which has less than 10% by weight of water.

The pKa of the acid is determined as usual under standard conditions in aqueous solution (not in the reaction mixture).

The process can be carried out in a batchwise, semicontinuous and continuous (e.g. on a spinning disc reactor) mode of operation. The process according to the invention and the copolymer obtained as a product of the process are particularly economical. Owing to the presence of the acid, virtually quantitative conversions can be achieved. In the process, it is possible to dispense with the usual molecular weight regulators, such as, for example, mercaptans. Owing to the low water content or the absence of water, the shelf-life is good.

The standard antifoams usually used are soluble in the copolymer prepared by the process according to the invention, so that, for avoiding foam formation, the copolymer prepared by the process according to the invention requires no antifoam structural units, incorporated in the form of polymerized units. The setting rate of concrete is usually not markedly retarded by the copolymer prepared by the process according to the invention.

In a particularly preferred embodiment, the reaction mixture in which the reaction of the maleic acid monoester derivative with the vinyl ester is effected contains 0.001 mol to 0.7 mol of the acid per total reacted mole of maleic acid monoester derivative and in each case optionally maleic acid, maleic anhydride and polyether alcohol according to the general formula (III)

$$HO-(C_mH_{2m}O)_n-R^3 \quad (III)$$

where
$R^3$ is identical or different (variable within different polyether alcohol individuals which may be present in the reaction mixture) and is represented by a branched or straight-chain $C_1$ to $C_{20}$ alkyl radical (preferably $CH_3$), $C_5$ to $C_8$ cycloalkyl radical (preferably cyclohexyl) and/or $C_6$ to $C_{14}$ alkylaryl radical (preferably toluoyl)—(overall, however, $R^3$ is particularly preferably $CH_3$),
m is identical or different (variable within different polyether alcohol individuals which may be present in the reaction mixture) and is represented by 2, 3 and/or 4,
n is identical or different (variable within different polyether alcohol individuals which may be present in the reaction mixture) and is represented by an integer from 1 to 150.

Usually, the reaction of the maleic acid monoester derivative with the vinyl ester is then effected in the reaction mixture with the proviso that the sum of the proportions by weight of the copolymer, of the acid, of the maleic acid monoester derivative, of the vinyl ester, of the maleic acid, of the maleic anhydride and of the polyether alcohol of the general formula (III) in the reaction mixture is at least 60%.

According to a further preferred embodiment, by reaction of the maleic acid monoester derivative with the vinyl acetate,
i) 35 to 55, preferably 45 to 50, mol % of the maleic acid structural unit α,
ii) 45 to 65, preferably 50 to 55, mol % of the vinyl acetate structural unit β
are produced in the copolymer.

The maleic acid monoester derivative structural unit α is preferably represented by the following general formula (I),

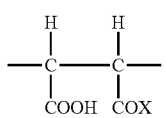

(I)

where
X is identical or different and is represented by —O—$(C_mH_{2m}O)_n$—$CH_3$,
m is identical or different and is represented by 2 and/or 3 (preferably 2),
n is identical or different and is represented by an integer from 4 to 60 (preferably 8 to 50).

The copolymers prepared by the process according to the invention are still liquid and hence pourable, depending on the degree of alkoxylation and process variant (in particular metering of vinyl ester, starting temperature). Frequently, the copolymers have polyether side chain segments which have both ethoxy groups (m=2) and propoxy groups (m=3). The propoxy groups depress the melting point of the copolymer. The copolymers prepared by the process according to the invention can also be mixed for the application so that liquid copolymers having shorter side chains and lower average molecular weights are used as "solvents" for more viscous copolymer species having longer side chains and higher molecular weights.

Vinyl acetate is preferably used as the vinyl ester, and the vinyl ester structural unit 3 is represented by the general formula (II) so that $R^2$ is $CH_3$.

Typically, copolymers obtained by free radical polymerization of maleic acid derivatives with vinyl esters have an approximately alternating structure. An alternating structure of a copolymer usually results in better predictability of the polymer property and easier planning of the synthesis. The copolymer prepared by the process according to the invention can in principle also contain further structural units, for example those of styrene or those of vinyl ethers, but preferably only up to 10 mol %, based on the sum of all structural units of the copolymer.

In an embodiment of the invention, however, maleic acid and/or maleic anhydride are reacted in addition to the maleic acid monoester derivative and the vinyl ester in the process according to the invention. In this case, up to 75 mol % of structural units comprising the maleic acid monoester derivative structural unit α, the maleic acid structural unit α' and the maleic anhydride structural unit α" are produced in the copolymer, the maleic acid structural unit α' and the maleic anhydride structural unit α" each being represented by the following formulae (IV) and (V):

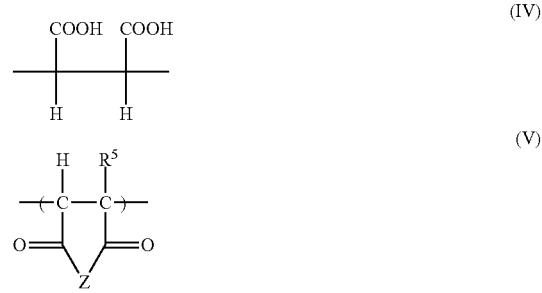

where
$R^5$ is represented by H and Z is represented by O.

By using maleic acid and/or maleic anhydride as comonomers, the side chain density (regarding the long side chains) can be reduced. The charge densities of the copolymer can be varied in this way, with the result that modified adsorption behaviour of the copolymer is produced.

As a rule, the reaction mixture in which the reaction of the maleic acid monoester derivative with the vinyl ester is effected contains less than 3% by weight, particularly preferably less than 0.2% by weight, of water. An anhydrous reaction mixture would be optimum.

Usually, this reaction mixture has 0.01 mol to 0.3 mol, preferably 0.05 mol to 0.3 mol, of the acid per total reacted mole of maleic acid monoester derivative.

The acid preferably has a pKa of less than 1.6, particularly preferably less than 1.3.

Frequently, the acid is present as methanesulphonic acid, sulphuric acid, para-toluenesulphonic acid, trifluoromethanesulphonic acid, benzenesulphonic acid and/or trichloroacetic acid or a mixture of at least two of these species.

In general, the sum of the proportions by weight of the copolymer, of the acid, of the maleic acid monoester derivative, of the vinyl ester, of the maleic acid, of the maleic anhydride and of the polyether alcohol of the general formula (III) in the reaction mixture is at least 70%, preferably at least 90%.

Typically, the polyether alcohol of the general formula (III) is present according to HO—$(C_mH_{2m}O)_n$—$C_3$ where m is identical or different and is represented by 2 and/or 3 (preferably 2) and n is identical or different and is represented by an integer from 4 to 60 (preferably 8 to 50).

In an embodiment of the invention, further alcohols which have not more than 12 carbon atoms are present in the reaction mixture in addition to the polyether alcohol according to the general formula (III). These further alcohols which have not more than 12 carbon atoms may be present as primary aliphatic alcohols, in particular methanol, ethanol or n-butanol, or as secondary alcohols, in particular isopropyl alcohol, cyclohexanol, or mixtures thereof. Usually, the further alcohols having not more than 12 carbon atoms are present in the reaction mixture in a molar deficit compared with the sum of the maleic acid monoester derivative and of the polyether alcohol according to the general formula (III).

If appropriate, the underlying transesterification can be activated by customary esterification catalysts, such as, for example, methanesulphonic acid, toluenesulphonic acid, sodium acetate, triethylamine, pyridine or pyridine derivatives, such as 4-dimethylaminopyridine (DMAP).

It should also be mentioned that corresponding ester cleavages can occur at the side chains in the copolymer prepared by the process according to the invention (for example owing to water present), so that side chains terminated by hydroxyl groups result.

Expediently, the reaction of the maleic acid monoester derivative with the vinyl ester is carried out at a temperature of 0 to 150° C., preferably 40 to 140° C., and pressures of 0 to 5 bar, preferably about atmospheric pressure.

Usually, the polymerization initiator is present as an azo compound or as an organic peroxide, preferably as dibenzoyl peroxide. The organic peroxides are metered in solid form or as solutions.

Frequently, the reaction of the maleic acid monoester derivative with vinyl ester is effected with a conversion of at least 80%, preferably at least 90%, based on the molar sum of maleic acid monoester derivative and vinyl acetate.

After reaction of the maleic acid monoester derivative with vinyl ester—i.e. preferably after the copolymerization—it is also possible to effect neutralization with a base, e.g. triethylamine, ammonia or alcoholate. Typically, a pH of 4 to 7 is established thereby. By the addition of base (salt formation), a firmer consistency is frequently imparted to the product of the process, with the result that the use thereof as a powder can be improved.

Furthermore, the invention relates to a copolymer which can be prepared by the process described above. The copolymer according to the invention has as a rule a weight average molecular weight of 10 000 to 350 000, preferably 20 000 to 200 000.

Finally, the invention relates to the use of the copolymer according to the invention as a dispersant for hydraulic binders, which are generally present as cement, lime, gypsum or anhydrite, preferably as cement. The copolymer according to the invention is suitable in particular for use in dry mortars. The use in conjunction with sandwich-type plasterboards should also be mentioned.

The working examples below are intended to explain the invention in more detail:

General:

The preparation examples below were carried out in a 500 ml pressure-resistant double-walled vessel with thermometer, anchor stirrer, pressure-measuring apparatus and 2 connections for separate feeds.

EXAMPLE 1

Synthesis without Acid Addition (not According to the Invention)

236.37 g (0.19 mol) of methylpolyethylene glycol monomaleate (1150 MPEG), 1.85 g (18.9 mmol) of maleic anhydride and 27.62 g (0.32 mol) of vinyl acetate are initially introduced and a mixture of 3.36 g (10.41 mmol) of dibenzoyl peroxide (75%) and 9.67 g (83.34 mmol) of maleic acid is metered in at 80° C. in the course of 1 h, a peak pressure of 0.8 bar developing. The mixture is allowed to cool and is stirred for a further 1 h. Gel permeation chromatography (GPC) shows a conversion of only 19%.

EXAMPLE 1a

Synthesis with Acid Addition 236.37 g (0.19 mol) of methylpolyethylene glycol monomaleate (1150 MPEG), 1.85 g (18.9 mmol) of maleic anhydride, 27.62 g (0.32 mol) of vinyl acetate and 0.4 g (4.17 mmol) of methanesulphonic acid are initially introduced and a mixture of 3.36 g (10.41 mmol) of dibenzoyl peroxide (75%) and 9.67 g (83.34 mmol) of maleic acid is metered in at 80° C. in the course of 1 h, a peak pressure of 1.0 bar developing. The mixture is allowed to cool and is stirred for a further 1 h. GPC shows a conversion of 91%.

EXAMPLE 2

142.05 g (0.28 mol) of methylpolyethylene glycol (Mw 500), 30.63 g (0.31 mol) of maleic anhydride and 0.23 g (2.84 mmol) of sodium acetate are initially introduced and stirred for 1 h at 80° C. Thereafter, 37.66 g (0.44 mol) of vinyl acetate and 0.61 g (6.25 mmol) of methanesuiphonic acid are added and 5.04 g (15.6 mmol) of dibenzoyl peroxide (75%) are metered in at 70° C. in the course of 1 h, a peak pressure of about 1.1 bar developing. After the end of the addition, stirring is effected for a further hour, the reaction mixture cooling. A dark orange, gel-like polymer having a number average molar mass ($M_n$) of about 68 000 g/mol is obtained.

EXAMPLE 3

0.21 g (2.56 mmol) of sodium acetate is added to 123.40 g (0.25 mol) of methylpolyethylene glycol (Mw 500), 84.08 g (0.08 mol) of Pluriol A 1020 E+20% PO (1000 g/mol)* and 35.57 g (0.363 mol) of maleic anhydride and stirring is effected for 1 h at 80° C. Thereafter, 0.61 g (6.25 mmol) of methanesuiphonic acid and 34.43 g (0.40 mol) of vinyl acetate are added with stirring and 5.04 g (15.62 mmol) of dibenzoyl peroxide (75%) are metered in at 85° C. in the course of 1 h. Stirring is effected for a further 1 h with supply of heat, a maximum pressure of 1.0 bar resulting. After cooling, a very fluid polymer having a molecular weight of about 30 000 g/mol is obtained with virtually quantitative conversion.

\* means: methylpolyethylene glycol grafted with 20% of propylene oxide.

EXAMPLE 4

230.48 g (0.39 mol) of methylpolyethylene glycol monomaleate (500 MPEG), 47.40 g (0.55 mol) of vinyl acetate and 0.80 g (8.34 mmol) of methanesulphonic acid are initially introduced and 6.72 g (20.82 mmol) of dibenzoyl peroxide (75%), 9.69 g (83.4 mmol) of maleic acid and 0.89 g (8.34 mmol) of 3-mercaptopropionic acid are metered in at 75-80° C. in the course of 1 h, a peak pressure of about 1.4 bar developing. After the end of the addition, stirring is effected for a further hour with cooling of the reaction mixture. An amber-coloured, pourable polymer is obtained with virtually quantitative conversion and a molecular weight ($M_w$) of about 20 000 g/mol.

EXAMPLE 5

129.55 g (0.22 mol) of methylpolyethylene glycol monomaleate (500 MPEG), 150.80 g (0.07 mol) of methylpolyethylene glycol monomaleate (2000 MPEG), 37.66 g (0.44 mol) of vinyl acetate and 0.61 g (6.25 mmol) of methanesulphonic acid are initially introduced and 5.05 g (15.62 mmol) of dibenzoyl peroxide are metered in at 86° C. in the course of 1 h, a peak pressure of about 0.5 bar developing.

EXAMPLE 6

259.38 g (0.43 mol) of methylpolyethylene glycol monomaleate (500 MPEG) and 0.92 g (9.38 mmol) of methanesulphonic acid are initially introduced and 7.56 g (23.43 mmol) of dibenzoyl peroxide (75%) and 56.5 g (0.66 mol) of vinyl acetate are metered in separately via the two feeds at 60° C. in the course of 1 h, a peak pressure of 0.8 bar developing. After the end of the addition, stirring is effected for a further hour, the reaction mixture cooling. A yellow, pourable polymer is obtained with virtually quantitative conversion and a molecular weight of about 40 000 g/mol and a polydispersity of 2.3 in aqueous GPC.

EXAMPLE 7

The amounts of substances used are as described under Example 6, but the separate metering of the initiator and of the vinyl acetate is effected at 66° C. A peak pressure of 0.7 bar results. After the end of the addition, stirring is effected for a further hour, the reaction mixture cooling. A yellow, honey-like polymer is obtained with virtually quantitative conversion and a molecular weight of about 37 000 g/mol and a polydispersity ($M_w:M_n$) of 2.75 in aqueous GPC.

EXAMPLE 8

455.0 g (0.91 mol) of methylpolyethylene glycol (Mw 500), 137.29 g (1.40 mol) of maleic anhydride and 0.75 g (9.1 mmol) of sodium acetate are initially introduced and stirred for 1 h at 80° C. The mixture is allowed to cool and 17.28 g (0.54 mol) of methanol are added and stirring is effected for 1 h at 50 to 60° C. Thereafter, 132.44 g (1.54 mol) of vinyl acetate and 2.68 g (28 mmol) of methanesulphonic acid are added and 8.08 g of dibenzoyl peroxide (75%) are metered in at 80° C. in the course of 30 min. After the end of the addition, stirring is effected for a further hour, the reaction mixture cooling.

EXAMPLE 9

228.0 g (0.37 mol) of methylpolyethylene glycol monomaleate (500 MPEG), 3.68 g (37.5 mmol) of maleic anhydride, 39.08 g (0.45 mol) of vinyl acetate and 0.37 g (3.75 mmol) of concentrated sulphuric acid are initially introduced and 1.67 g of dibenzoyl peroxide (75%) are metered in at 80° C. in the course of 2 h. A peak pressure of 1.0 bar results. After the end of the addition, stirring is effected for a further hour, the reaction mixture cooling. A still pourable polymer having a molecular weight of about 32 000 g/mol is obtained with virtually quantitative yield.

EXAMPLE 10a

Pressureless Synthesis 280.88 g (0.46 mol) of methylpolyethylene glycol monomaleate (500 MPEG), 4.51 g (46 mmol) of maleic anhydride, 61.24 g (0.71 mol) of vinyl acetate and 1.0 g (10.32 mmol) of methanesulphonic acid are initially introduced and heated to 70° C. with stirring. 8.20 g (25.4 mmol) of dibenzoyl peroxide (75%) are then metered in the course of 1 h. Stirring is effected for a further 2.5 h at the same temperature, followed by cooling. A yellow, honey-like polymer is obtained with virtually quantitative conversion and a molecular weight of about 37 000 g/mol and a polydispersity ($M_w:M_n$) of 2.55 in aqueous GPC.

EXAMPLE 10b

Pressureless Synthesis 187.50 g (0.38 mol) of methylpolyethylene glycol (Mw=500), 40.43 g (0.41 mol) of maleic anhydride and 0.31 g (3.8 mmol) of sodium acetate are stirred at 80° C. for 1 h. Thereafter, the mixture is allowed to cool and 39.08 g (0.45 mol) of vinyl acetate, 0.37 g (3.7 mmol) of concentrated sulphuric acid and 1.67 g (5.2 mmol) of dibenzoyl peroxide are added and the mixture is heated to 70° C. Stirring is effected for a further 6 h at this temperature, followed by cooling. A pale yellow, gel-like polymer is obtained in virtually quantitative yield.

1% of antifoam was added to Example 6

| Antifoam | at the beginning | Remark after 12 weeks |
|---|---|---|
| Triisobutyl phosphate | clear solution | clear solution |
| Ibentin SG/707/AG | cloudy emulsion | cloudy emulsion but no separation detectable |
| Surfynol 2502 | clear solution | clear solution |

Mixing Sequence for Mortar Mix:

600 g of cement powder are homogenized in the dry state and introduced into an RILEM mixer. The amount of water required according to a w/c value is then added and mixing is effected for 30 s at 140 rpm (speed I). The addition of the sand mixture is then effected with a mixer running with the aid of a funnel, and mixing is effected for 30 s at 140 rpm (speed I). After pausing for 1.5 min during mixing and cleaning the edges of the mixer, a corresponding amount of superplasticizer is added. Mixing is effected for a further 60 s at 285 rpm (speed II) and the slump is then determined by tapping 15 times on a slump table with a Hägermann cone.

Mixing Sequence for Concrete Mix:

A 30 l mixer is used for the concrete mix. 4.8 kg of cement and the corresponding amount of aggregates are premixed in the dry state for 10 s. Thereafter, 300 ml of initially introduced water and, after mixing for a further 2 min, the amount of residual water required according to the w/c value used are added. After a further 60 s, the dissolved superplasticizer (0.2% by weight of solid/cement) is added to the concrete mix and the mixing process is ended after 60 s with the determination of the slump.

Formulations of the Mortar and Concrete Mix for Mortar and Concrete Tests:

| Composition | Mortar test | | | Concrete test | | |
|---|---|---|---|---|---|---|
| | s/c value [a] = 2.2 | | Weight [g] | s/g value [b] = 0.47 | | Weight [kg/m³] |
| Aggregates | Quartz sand | 30% | 178.2 | Quartz sand 0/0.5 | 8.0% | 152.1 |
| | Standard sand 0/0.25 | 70% | 415.8 | Quartz sand 0/1.0 | 3.0% | 56.5 |
| | | | | Standard sand 0/4 | 35.5% | 680.0 |
| | | | | Gravel 4/8 | 15.5% | 294.2 |
| | | | | Gravel 8/16 | 38.0% | 722.5 |
| Cement | CEM I 42.5R [c] | | 270.0 | CEM I 42.5R [d] | | 330.0 |
| Super-plasticizer [e] | (20% strength solution) | | 2.7 | (20% strength solution) | | 3.2 |
| Water | | | [f] | | | [f] |

[a] s/c value = sand/cement value = Σ sand [g] + cement [g]
[b] s/g value = sand/sand gravel value = Σ sand [g]+ (Σ sand [g] + Σ gravel [g])
[c] origin of cement: Karlstadt (Germany)
[d] origin of cement: Bernburg (Germany)
[e] 0.2% by mass of solid, based on cement
[f] The required amount of water is dependent on the set w/c value [g] according to the superplasticizer used.
[g] w/c value = water/cement value = Σ water [g] + cement [g]

Mortar Results:

| Polymer No. | Dos.[a] | w/c value[b] | Slump[c] [cm] | | | |
|---|---|---|---|---|---|---|
| | | | 0' | 30' | 60' | 90' |
| Zero mix | — | 0.55 | 25.0 | 23.7 | — | — |
| Glenium 27 | 0.24 | 0.49 | 25.0 | 24.5 | — | — |
| Glenium 51 | 0.2 | 0.395 | 24.5 | 23.1 | — | — |
| Example 1a | 0.2 | 0.46 | 24.4 | 22.1 | — | — |
| Example 2 | 0.2 | 0.46 | 25.0 | 25.6 | 24.4 | 21.2[d] |
| Zero mix | — | 0.55 | 24.7 | 22.6 | — | — |
| Glenium 27 | 0.24 | 0.48 | 24.7 | 24.5 | 24.4 | 24.7 |
| Glenium 51 | 0.2 | 0.39 | 24.1 | 23.3 | 22.0 | 21.3 |
| Example 4 | 0.2 | 0.435 | 24.0 | 20.7 | — | — |
| Example 5 | 0.2 | 0.47 | 23.2 | 24.9 | 22.4 | 20.9 |
| Example 6 | 0.2 | 0.47 | 24.2 | 27.5 | 23.9 | 22.3 |
| Example 7 | 0.2 | 0.47 | 24.0 | 25.8 | 22.3 | 21.3 |
| Zero mix | — | 0.57 | 24.7 | 23.4 | 23.5 | 23.3 |
| Glenium 27 | 0.24 | 0.49 | 24.3 | 24.9 | 24.3 | 24.5 |
| Glenium 51 | 0.2 | 0.39 | 24.8 | 22.7 | 22.6 | 22.2 |
| Example 8 | 0.2 | 0.47 | 24.0 | 26.9 | 23.5 | 21.9 |
| Example 10b | 0.2 | 0.46 | 24.5 | 26.1 | 23.1 | 22.1 |

[a] Dos. = dose [% by mass of polymer based on cement]
[b] w/c value = water/cement value: indicates the required amount of water for producing a flowable mortar with a constant amount of cement.
[c] Slump, determined after 0, 30, 60 and 90 min.
[d] After 2 hours Strength Investigations with Bernburg Cement

| Polymer | Dos.[a] [%] | w/c value[b] | Slump [cm][c] | Temp. [°C.] | Density of the test specimen [kg/m³] | Flexural tensile strength [N/mm²] 24 h | Compressive strength [N/mm²] 24 h |
|---|---|---|---|---|---|---|---|
| Glenium 51 | 0.08 | 0.45 | 24 | 23.5 | — | 5.55 | 25.96 |
| Glenium 27 | 0.2 | 0.45 | 24.7 | 23.7 | — | 5.04 | 22.95 |
| Example 3 | 0.2 | 0.45 | >30 | 23.1 | 2.276 | 5.61 | 26.18 |
| Example 5 | 0.2 | 0.45 | 23.4 | 23.3 | 2.246 | 5.16 | 23.86 |
| Example 9 | 0.2 | 0.45 | 27.6 | 23.2 | 2.286 | 5.4 | 24.34 |
| Example 10b | 0.2 | 0.45 | 28.5 | 23.6 | 2.276 | 4.79 | 22.13 |

[a] Dos. = dose [% by mass of polymer, based on cement]
[b] w/c value = water/cement value: indicates the required amount of water for producing a flowable mortar with a constant amount of cement.
[c] Slump, determined after 0 min.

Concrete Tests:

| Polymer No. | Dos.[a] | w/c value[b] | Slump[c] [cm] | | | | Bulk density of fresh concrete [kg/m³] | Strengths [N/mm²] | | |
|---|---|---|---|---|---|---|---|---|---|---|
| | | | 0' | 10' | 30' | 60' | | 16 h | 24 h | 7 d |
| Glenium 27 | 0.40 | 0.5 | 60.5 | 60.5 | 58 | 58 | 2.4405 | 2.765 | — | — |
| Example 4 | 0.24 | 0.5 | 62.5 | 59 | 49 | 42 | — | — | — | — |
| Example 5 | 0.30 | 0.5 | 58 | 66 | 59 | 49.5 | 2.433 | 8.005 | 16.65 | 44.65 |
| Example 6 | 0.30 | 0.5 | 62.5 | 67.5 | 64 | 52 | 2.4425 | 7.03 | 17.0 | 44.70 |
| Example 7 | 0.30 | 0.5 | 62 | 65.5 | 63 | 49.5 | 2.4425 | 6.995 | 17.20 | 46.95 |
| Example 10a | 0.30 | 0.5 | 62.5 | 65 | 59 | 49.5 | 2.427 | 7.31 | 16.10 | 46.20 |

[a]Dos. = dose [% by mass of polymer, based on cement]
[b]w/c value = water/cement value: indicates the required amount of water for producing a flowable mortar with a constant amount of cement.
[c]Slump, determined after 0, 30, 60 and 90 min.

The mortar and concrete tests show that the copolymers prepared produce a water reduction comparable to that of commercially available products (Glenium 27, Glenium 51). In the case of a standard dose of 0.2%, sufficient processability of the building material mixtures over time can be achieved. The results of the strength investigations give no indications of a relevant retardation of the hydration of these mixtures, which would not have been expected a priori.

A dispersant having particularly low raw materials costs can be provided by the present invention. Comparable strengths are achieved with shorter side chains than, for example, Glenium 27. The copolymers have a very long shelf-life, making it possible to dispense with high-energy drying. Moreover, release of acetaldehyde is not to be expected.

The invention claimed is:

1. A process for the preparation of a copolymer by reacting a maleic acid monoester derivative with a vinyl ester in the presence of a free radical polymerization initiator and of an acid having a $pK_a$ of less than 1.8 so that
i) 10 to 75 mol % of a maleic acid monoester derivative structural unit α, and
ii) 25 to 90 mol % of a vinyl ester structural unit β
are produced in the copolymer,
the maleic acid monoester derivative structural unit a being represented by the following general formula (I):

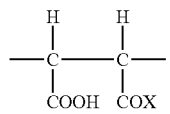
(I)

where
X is identical or different and is represented by —O—$(C_mH_{2m}O)_n$—$R^1$ where $R^1$ is identical or different and is represented by a branched or straight-chain $C_1$ to $C_{20}$ alkyl radical, $C_5$ to $C_8$ cycloalkyl radical and/or $C_6$ to $C_{14}$ alkylaryl radical,
m is identical or different and is represented by 2, 3 and/or 4,
n is identical or different and is represented by an integer from 1 to 150;
the vinyl ester structural unit β being represented by the following general formula (II):

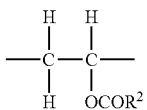
(II)

where
$R^2$ is identical or different and is represented by a branched or straight-chain $C_1$ to $C_{12}$ alkyl radical,
and the reaction of the maleic acid monoester derivative with the vinyl ester is effected in a reaction mixture which has less than 10% by weight of water.

2. A process according to claim 1, wherein the reaction mixture in which the reaction of the maleic acid monoester derivative with the vinyl ester is effected contains 0.001 mol to 0.7 mol of the acid per total reacted mole of maleic acid monoester derivative and optionally maleic acid, maleic anhydride, and polyether alcohol according to the general formula (III):

$$HO—(C_mH_{2m}O)_n—R^3 \quad (III)$$

where
$R^3$ is identical or different and is represented by a branched or straight-chain $C_1$ to $C_{20}$ alkyl radical, $C_5$ to $C_8$ cycloalkyl radical and/or $C_6$ to $C_{14}$ alkylaryl radical,
m is identical or different and is represented by 2, 3 and/or 4,
n is identical or different and is represented by an integer from 1 to 150.

3. A process according to claim 2, wherein the reaction of the maleic acid monoester derivative with the vinyl ester is effected in the reaction mixture with the proviso that the sum of the proportions by weight or the copolymer, of the acid, of the maleic acid monoester derivative, of the vinyl ester, of the maleic acid, of the maleic anhydride, and of the polyether alcohol of the general formula (III) in the reaction mixture is at least 60%.

4. A process according to claim 3, wherein the sum of the proportions by weight or the copolymer, of the acid, of the maleic acid monoester derivative, of the vinyl ester, of the maleic acid, of the maleic anhydride, and of the polyether alcohol of the general formula (III) in the reaction mixture is at least 70%, optionally at least 90%.

5. A process according to claim 1, wherein the vinyl ester used is vinyl acetate and the vinyl ester structural unit β is represented by the general formula (II) so that $R^2$ is $CH_3$.

6. A process according to claim 1, wherein by reaction of the maleic acid monoester derivative with the vinyl ester
i) 35 to 55 mol % of the maleic acid monoester derivative structural unit α, and ii) 45 to 65 mol % of the vinyl ester structural unit β
are produced in the copolymer.

7. A process according to claim 1, wherein the maleic acid monoester derivative structural unit α is represented by the following general formula (I):

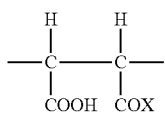

(I)

where

X is identical or different and is represented by —O—$(C_mH_{2m}O)_n$—$CH_3$, m is identical or different and is represented by 2 and/or 3, and n is identical or different and is represented by an integer from 4 to 60.

8. A process according to claim 1, wherein the reaction mixture contains less than 3% by weight of water, optionally less than 0.2% by weight of water.

9. A process according to claim 2, wherein the reaction mixture contains 0.01 mol to 0.3 mol of the acid per total reacted mole of maleic acid monoester derivative.

10. A process according to claim 1, wherein the acid has a $pK_a$ of less than 1.6, optionally less than 1.3.

11. A process according to claim 1, wherein the acid is present as methanesulphonic acid, sulphuric acid, para-toluenesulphonic acid, trifluoromethanesulphonic acid, benzenesulphonic acid and/or trichloroacetic acid or a mixture of at least two thereof.

12. A process according to claim 1, wherein in addition to the maleic acid monoester derivative and the vinyl ester, maleic acid and/or maleic anhydride is additionally reacted and up to 75 mol % of structural units comprising the maleic acid monoester derivative unit α, the maleic acid structural unit α', and the maleic anhydride structural unit α" are produced in the copolymer, the maleic acid structural unit α' and the maleic anhydride structural unit α" respectively being represented by the following formulae (IV) and (V):

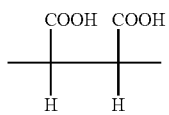

(IV)

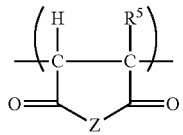

(V)

where $R^5$ is represented by H and Z is represented by O.

13. A process according to claim 2, wherein the polyether alcohol of the general formula (III) is present according to HO—$(C_mH_{2m}O)_n$—$CH_3$ where m is identical or different and is represented by 2 and/or 3 and n is identical or different and is represented by an integer from 4 to 60.

14. A process according to claim 2, wherein further alcohols which have not more than 12 carbon atoms are present in the reaction mixture in addition to the polyether alcohol according to the general formula (III).

15. A process according to claim 14, wherein the further alcohols which have not more than 12 carbon atoms are present as primary aliphatic alcohols, optionally methanol, ethanol or n-butanol, or as secondary alcohols, optionally isopropyl alcohol, cyclohexanol, or mixtures thereof.

16. A process according to claim 14, wherein the further alcohols which have not more than 12 carbon atoms are present in the reaction mixture in a molar deficit compared with the sum of the maleic acid monoester derivative and of the polyether alcohol according to the general formula (III).

17. A process according to claim 1, wherein the reaction of the maleic acid monoester derivative with the vinyl ester is carried out at a temperature of 0 to 150° C. and pressures of 0 to 5 bar.

18. A process according to claim 1, wherein the free radical polymerization initiator is present as an azo compound or as an organic peroxide, optionally dibenzoyl peroxide.

19. A process according to claim 1, wherein the reaction of the maleic acid monoester derivative with the vinyl ester is effected with a conversion of at least 80%, optionally at least 90%, based on the molar sum of maleic acid monoester derivative and vinyl ester.

20. A process according to claim 1, wherein after reaction of the maleic acid monoester derivative with the vinyl ester, neutralization is effected with a base.

* * * * *